United States Patent [19]

Teraoka et al.

[11] 4,438,333

[45] Mar. 20, 1984

[54] NOISE ERASING APPARATUS FOR STIMULABLE PHOSPHOR SHEET

[75] Inventors: Masanori Teraoka; Takao Komaki; Seiji Matsumoto, all of Kanagawa, Japan

[73] Assignee: Fuji Photo Film Co., Ltd., Kanagawa, Japan

[21] Appl. No.: 339,795

[22] Filed: Jan. 15, 1982

[30] Foreign Application Priority Data

Jan. 16, 1981 [JP] Japan .................................... 56-4889

[51] Int. Cl.$^3$ ................................................ G01T 1/11

[52] U.S. Cl. .................................. 250/327.2; 250/337

[58] Field of Search ................... 250/327.2, 337, 484.1

[56] References Cited

U.S. PATENT DOCUMENTS 3,859,527 1/1975 Luckey ............................ 250/327.2

4,400,619 8/1983 Kotera et al. .................... 250/327.2

*Primary Examiner*—Alfred E. Smith

*Assistant Examiner*—T. N. Grigsby

*Attorney, Agent, or Firm*—Sughrue, Mion, Zinn, Macpeak & Seas

[57] ABSTRACT

An apparatus for erasing the fog developing in a stimulable phosphor sheet used for a radiation image recording and reproducing system in which a radiation image is once recorded in the stimulable phosphor sheet and then read out and reproduced on a recording material. The apparatus is arranged so that stimulable phosphor sheets are taken up one at a time out of their reservoir and each is loaded into a cassette used for the recording of a radiation image. It comprises a light source for erasing the fog, which is provided between the aperture of the reservoir from which the stimulable phosphor sheets are taken up and the section at which the sheets are loaded into the cassettes.

12 Claims, 3 Drawing Figures

NOISE ERASING APPARATUS FOR STIMULABLE PHOSPHOR SHEET

BACKGROUND OF THE INVENTION

1. Field of the Invention

This invention relates to an apparatus for effectively erasing the noise developing in a visible image reproduced from a stimulable phosphor sheet carrying a radiation image. This invention particularly relates to an apparatus for effectively erasing the noise developing in such a reproduced visible image due to repeated use of the stimulable phosphor sheet in a radiation image information recording and reproducing method where the stimulable phosphor sheet is exposed to a radiation to record a radiation image therein and then exposed to a stimulating ray to cause it to emit light in the pattern of the stored image, the emitted light is converted to an electric signal, and a visible image corresponding to the radiation image is reproduced by use of the electric signal.

2. Description of the Prior Art

When certain kinds of phosphors are exposed to a radiation like X-rays, α-rays, β-rays, γ-rays or ultraviolet rays, they store a part of the energy of a radiation. Then, when the phosphor which has been exposed to the radiation is exposed to a stimulating ray such as visible ray, light is emitted from the phosphor upon stimulation thereof in the pattern of the stored radiation energy. A phosphor exhibiting such properties is referred to as a stimulable phosphor.

As disclosed in U.S. Pat. Nos. 3,859,527 and 4,276,773, U.S. Pat. appln. Ser. Nos. 104,855 and 220,780, and Japanese Unexamined Patent Publication No. 56(1981)-11395, it has been proposed to use a stimulable phosphor for recording a radiation image of the human body for medical diagnosis. In more detail, the stimulable phosphor is first exposed to a radiation to cause it to store a radiation image therein, the stimulable phosphor is then scanned with a stimulating ray to cause it to emit light in the pattern of the stored image, and the light emitted from the stimulable phosphor upon stimulation thereof is photoelectrically detected and converted to an electric signal. The obtained electric signal is processed as desired to reproduce a visible image having an image quality suitable for viewing and diagnosis purposes. This radiation image system using the stimulable phosphor has many advantages over conventional radiography using a silver halide photographic material, as described in U.S. Pat. No. 4,276,473 for example.

In the radiation image recording and reproducing method described above, the final visible image may be reproduced in the form of a hard copy or may be displayed on a cathode ray tube. The stimulable phosphor sheet used in this method may take various forms such as panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary that the reused stimulable phosphor sheet be made completely free from the previously stored radiation image. Theoretically, the radiation energy of the radiation image stored in the stimulable phosphor sheet should disappear when the sheet is scanned with a stimulating ray of a sufficient intensity to cause it to emit light therefrom according to the stored radiation image in the course of the radiation image recording and reproducing process as described above. Actually, however, the stored radiation energy cannot be completely eliminated only with the stimulating ray used to scan the stimulable phosphor sheet during the aforesaid process. Thus a part of the previously stored radiation image remains in the stimulable phosphor sheet after use and inconveniently causes noise to occur in the visible image reproduced from the stimulable phosphor sheet when it is reused. In order to successfully reuse the stimulable phosphor sheet, any residual radiation image thereon must first be erased completely.

Further, a stimulable phosphor contains a trace of radioactive isotopes such as $^{226}Ra$ and $^{40}K$, which emit radiations and cause the stimulable phosphor sheet to store the emitted radiation energy even when the sheet is not being used in radiography. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also causes noise to appear in the visible radiation image reproduced from a reused stimulable phosphor sheet and, therefore, must be erased before reusing the stimulable phosphor sheet.

In order to avoid the noise occurring in the reproduced visible radiation image due to the noise originating from the radiation image previously stored in the stimulable phosphor sheet and due to the fog developing during the storage of the sheet, the Applicant has proposed in his U.S. Pat. appln. Ser. No. 168,795 now U.S. Pat. No. 4,400,619 to stimulate a stimulable phosphor sheet by use of light of wavelengths including the wavelength range of the stimulating ray for the phosphor before storing a radiation image in the stimulable phosphor sheet, thereby to discharge the detrimental radiation energy therefrom to an acceptable extent.

With this method, however, erasing of the residual radiation image and fog in the stimulable phosphor sheet must be effected immediately before using the sheet for radiography. This is necessary to minimize the fog developing in the stimulable phosphor sheet after the erasing is conducted.

The inventors conducted experiments to find what levels of radiation energy of the residual image and the fog in the reused phosphor developed noise in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum of the original level is 100. On the other hand, the level of the fog developing in the phosphor is generally about 0.1 to 0.001 based on the maximum of the stored original radiation energy which is taken as 100 as described above. It has also been found that the fog must be erased to a level between about 0.01 and 0.0001 in order to prevent the fog from developing detrimental noise in the next radiographic operation.

However, in order to erase the radiation energy of the previously stored radiation image to between $10^{-4}$ and $10^{-6}$, the phosphor must be exposed to a high illuminance for a long period of time, for example to 30,000 1× for 100 to 1,000 seconds using a tungsten-filament lamp. This necessitates a large-scale erasing apparatus and, in addition, erasing must be started a considerable length of time before a radiograph is to be taken. Thus it is very difficult in practical use to carry out such a troublesome erasing operation each time a radiograph is to be taken. Further, it is very inconvenient in practical use to instal a large-scale erasing apparatus in the vicinity of the radiographic equipment.

The inventors conducted various experiments with respect to the aforesaid two kinds of causes of noise, and have found that the erasability thereof considerably differs between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same. That is to say, after the previously stored image is erased from the level of 100 to about 0.1, the resulting residual image suddenly becomes difficult to erase. For example, the previously stored image can be erased to a level of about 0.1 when exposed to light at an illuminance of 10,000 1× for about 10 seconds, but it takes about 100 seconds for the resulting residual image to further be erased to a level of 0.01. In contrast, fog of a level of about 0.1 can be erased in less than 1 second at an illuminance of 10,000 1×.

Based on the above-mentioned observations, the inventors have already proposed in Japanese patent application No. 56(1981)-2970 a noise erasing method comprising two erasing steps wherein the first erasing which requires a long period of time to erase the previously stored image is carried out at an appropriate point of time after the radiation image is stored in a stimulable phosphor and scanned with a stimulating ray, and the second erasing for the fog which can be erased quickly is conducted immediately before the next radiographic operation.

According to this proposed method, the first erasing in which the radiation image previously stored in the stimulable phosphor is to be erased at a high illuminance for a long period of time by use of a large-scale apparatus can be carried out at an appropriate point of time after the stimulable phosphor sheet is used for radiography. After the first erasing is finished, the stimulable phosphor sheet can be transferred to the vicinity of the site where it is to be used for the next radiographic operation. Thereafter, immediately before the next radiographic operation is to be started, the second erasing can be conducted in a short period of time to erase the fog, if any, by use of a simple small-scale apparatus. Thus this method can effectively eliminate the causes of noise and provide a noise-free reproduced visible radiation image.

SUMMARY OF THE INVENTION

The primary object of the present invention is to provide an apparatus for erasing noise in a radiation image information recording and reproducing method using a stimulable phosphor, which is capable of simply and effectively erasing noise.

Another object of the present invention is to provide an apparatus for erasing noise in a radiation image information recording and reproducing method using a stimulable phosphor, which is capable of quickly erasing noise immediately before radiography.

A further object of the present invention is to provide an apparatus for erasing noise in a radiation image information recording and reproducing method using a stimulable phosphor, which is small in size and can erase noise to an acceptable level at the site of radiography.

A still further object of the present invention is to provide an apparatus for erasing noise in a radiation image information recording and reproducing method using a stimulable phosphor, which is capable of simply carrying out the second erasing in the two-step erasing method described above.

In the conventional radiation image recording and reproducing system using an X-ray photographic film, a number of X-ray photographic films are generally loaded into cassettes one by one and used in the radiography in this form. It will therefore also be convenient in the radiation image recording and reproducing system using stimulable phosphor sheets to have the stimulable phosphor sheets loaded into cassettes one by one and used in radiography in this form so as to make the system compatible with the conventional system.

Accordingly, the above-mentioned objects of the present invention are accomplished by conducting the second erasing of the two-step erasing method described above simultaneously with the loading of the stimulable phosphor sheets into their respective cassettes.

Namely, the present invention is characterized in that, in an arrangement where stimulable phosphor sheets used in radiation image recording and reproducing are taken, one at a time, out of a sheet reservoir and loaded into cassettes for use in radiography, a light irradiation means for the second erasing is provided between the aperture of the sheet reservoir from which the stimulable phosphor sheets are taken up and the section at which the stimulable phosphor sheets are loaded into cassettes.

In the present invention, the exposure amount in the second erasing is selected within the range of 1/5 to 3/10,000 based on that in the first erasing. The term "exposure amount" as used herein means the illuminance of the erasing light multiplied by the time the stimulable phosphor is exposed to the erasing light.

The exposure amount to be used in the second erasing varies according to the sensitivity of the stimulable phosphor used. In general, however, it is at least 3,000 1×·sec., preferably from 15,000 to 30,000 1×·sec. Generally, it need not be above 100,000 1×·sec.

Of course, the power of the light source and the time during which the stimulable phosphor is exposed thereto may be selected freely, provided that an exposure amount within the aforesaid range can be secured.

For instance, in the case of a 356 mm×432 mm stimulable phosphor sheet, the aforesaid preferable range of exposure in the second erasing, i.e. from 15,000 to 30,000 1×·sec., can be achieved by exposing the stimulable phosphor sheet to a 500 W lamp for at least 0.8 second or to a 1 kW lamp for at most 0.8 second. The exposure amount of 3,000 1×·sec. which is the minimum necessary value for the second erasing can be achieved by exposing the stimulable phosphor sheet to a 500 W lamp for 0.16 second, while the maximum necessary exposure amount of 100,000 1×·sec. (values higher than this are operable but not necessary for the second erasing) can be obtained by exposure to a 1 kW lamp for 2.5 seconds.

Usually, it is desirable that the stimulable phosphor sheet be used in radiography within 8 hours, preferably within 6 hours, after it has been exposed to the erasing light by use of the erasing apparatus of the present invention and loaded into the cassette. This is because fog will develop in the stimulable phosphor if it is allowed to stand for a long period after being loaded into the cassette as described above.

DESCRIPTION OF PREFERRED EMBODIMENTS

The present invention will hereinbelow be described in further detail with reference to the accompanying drawings.

Figure 1:
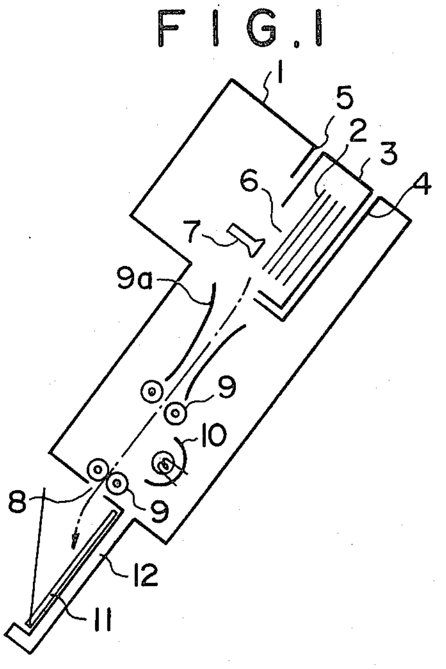
FIGS. 1, 2 and 3 are schematic views respectively showing arrangements for loading a stimulable phosphor sheet into a cassette in which various embodiments of the noise erasing apparatus according to the present invention are employed.

Referring to FIG. 1 showing an arrangement for loading a stimulable phosphor sheet into a cassette in which one embodiment in accordance with the present invention is employed, a body 1 of the arrangement has a magazine fitting section 4 which releasably holds a magazine 3 serving as a sheet reservoir capable of accommodating a plurality of stimulable phosphor sheets 2. In this embodiment, the magazine 3 is inserted into the magazine fitting section 4 through an inlet 5 in the body 1. At the upper section of the magazine fitting section 4 is provided a take-up arm 7 which employs suction to take up the stimulable phosphor sheets 2 one by one from an aperture 6 in the magazine 3 fitted to the magazine fitting section 4. At a section lower than the magazine fitting section 4 are positioned guide plates 9*a* which receive the sheet 2 taken up by the take-up arm 7 and guide it to two sets of sheet carrying rollers 9 for carrying it up to a sheet outlet 8. An illuminant 10 is positioned between the two sets of sheet transfer rollers 9 so that the sheet 2 can be exposed thereto. Further, a cassette fitting section 12 for releasably holding a cassette 11 capable of accommodating one stimulable phosphor sheet for radiography is located at a position lower than the sheet outlet 8 and outside the body 1.

The stimulable phosphor sheets 2 stored in the magazine 3 are sucked and taken up one at a time by the take-up arm 7. The illuminant 10 is synchronized with the movement of the stimulable phosphor sheet 2 so that it emits light when the forward end of the taken-up sheet 2 reaches the carrying rollers 9. The sheet 2 is exposed to light when it is passed over the illuminant 10 at a predetermined speed by the carrying rollers 9. At this time, the light irradiation power for the stimulable phosphor sheet is set at 3,000 to 100,000 1×·sec., preferably from 15,000 to 30,000 1×·sec. After being exposed to light emitted from the illuminant 10, the sheet 10 is ejected from the outlet 8 of body 1 and loaded into the cassette 11. In this embodiment of the present invention, the sheet 2 is passed over the illuminant 10 at a predetermined speed, so that the whole surface thereof is uniformly exposed to light emitted from the illuminant 10. The rotation speed of the carrying rollers 9 is controlled with respect to the light irradiation power of the illuminant 10 so as to secure an exposure amount within the aforesaid range.

In the above-described embodiment, the cassette fitting section 12 is positioned outside the body 1. However, it may be built into the body 1. The illuminant 10 may for example be a tungsten-filament, fluorescent, sodium, xenon or iodine lamp, or the like. Further, a belt, a chain or the like may be used to carry the sheet 2 at a predetermined speed, instead of the above-described sheet carrying rollers 9. In addition, the illuminant 10 may be left on continuously.

Figure 2:
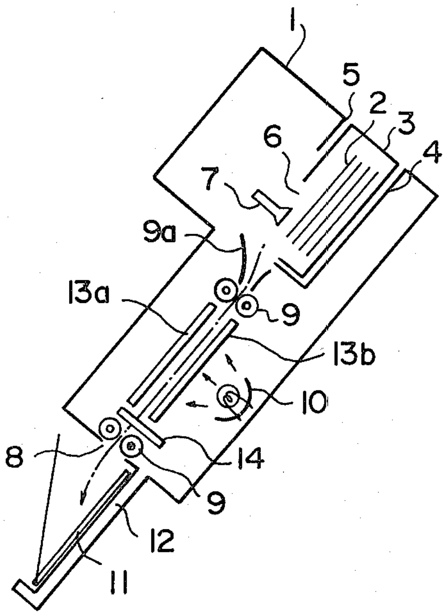

FIG. 2 shows an arrangement for loading a stimulable phosphor sheet into a cassette which employs another embodiment of the present invention. This second embodiment differs from the first described embodiment in that a pair of supporting plates 13*a*, 13*b* are used to guide and support the stimulable phosphor sheet 2 (the supporting plate 13*b* located on the side of the illuminant 10 is transparent), in that a stopper 14 is provided to hold the stimulable phosphor sheet 2 at a predetermined position, and in that the illuminant 10 may be a flashlamp. A plurality of stimulable phosphor sheets 2 contained in the magazine 3 are sucked and taken up one at a time by the take-up arm 7. The taken-up sheet 2 is moved by the carrying rollers 9 and stopped by the stopper 14 with the forward end thereof contacting the stopper 14. In this way, the sheet 2 is supported on the transparent supporting plate 13*b* positioned on the side nearer to the illuminant 10. In this condition, the sheet 2 is exposed to light emitted from the illuminant 10 through the transparent supporting plate 13*b*. At this time, the light irradiation power is preferably set at 10,000 to 100,000 1×·sec. When the irradiation is finished, the stopper 14 is released, and the sheet 2 is ejected from the sheet outlet 8 by the carrying rollers 9 and loaded into the cassette. In this second embodiment, the rotation speed of the sheet carrying rollers 9 need not necessarily be stable nor be controlled according to the power of the illuminant 10. Accordingly, the drive unit for the sheet carrying rollers 9 may be of a simple construction and, consequently, the structure of the whole arrangement can be simplified. Further, it is also possible to omit the carrying rollers 9.

Figure 3:
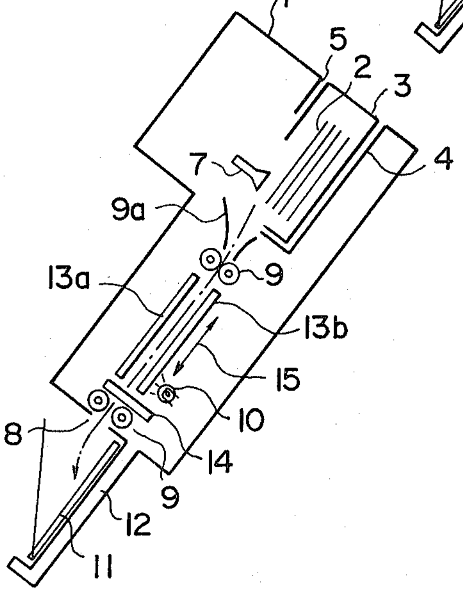

FIG. 3 shows an arrangement for loading a stimulable phosphor sheet into a cassette in which the third embodiment of the present invention is adopted. This third embodiment differs from the above-described second embodiment in that the same type of illuminant 10 as in the first embodiment described above, for instance a tungsten-filament lamp, a fluorescent lamp, sodium lamp, xenon lamp or the like is used, and in that there is used an illuminant moving means (not shown) for moving the illuminant 10 vertically in the direction of arrow 15 along the supporting plate 13*b*. The sheet 2 is supported on the transparent supporting plate 13*b* in the same way as in the second embodiment described above. The illuminant 10 moves along the supporting plate 13*b* at a predetermined speed while light is emitted therefrom. Thus the stimulable phosphor sheet 2 is exposed to light from its forward end up to its tail end. The moving speed of the illuminant 10 must of course be controlled in accordance with the power thereof. After the exposure is finished, the sheet 2 is loaded into the cassette 11 in the same manner as in the second embodiment mentioned above. Also in this third embodiment, the whole surface of the stimulable phosphor sheet 2 can be uniformly exposed to light as in the case of the first embodiment.

In each of the above-described embodiments of the present invention, the suction-type take-up arm 7 is used to take up the stimulable phosphor sheets 2 one by one from the aperture 6 of the magazine 3 fitted to the magazine fitting section 4. However, the take-up arm 7 may of cource be replaced by any other suitable type of means having a similar function.

As described above, the noise erasing apparatus in accordance with the present invention comprises a means for irradiating the stimulable phosphor sheets as they are taken up one by one from the sheet reservoir and loaded into cassettes for use in radiography. Therefore, the noise erasing apparatus of the present invention can reliably erase the noise-causing fog which develops in the stimulable phosphor to a practically acceptable low level by use of the irradiating means. Further, the erased stimulable phosphor sheet can be directly supplied to the radiographic apparatus at the next stage or to the radiation image recording and reproducing system as loaded in a cassette. Accordingly, the noise erasing apparatus in accordance with the present invention assures a noise-free sharp radiation image in a simple and reliable manner.

We claim:

1. In an arrangement wherein stimulable phosphor sheets for use in a radiation image recording and reproducing system are taken up one at a time out of a stimulable phosphor sheet reservoir containing stimulable phosphor sheets and each is loaded into a cassette used for the recording of a radiation image, a noise erasing apparatus for stimulable phosphor sheets comprising an irradiation means for emitting noise erasing light, which is provided between the aperture of said stimulable phosphor sheet reservoir from which said stimulable phosphor sheets are taken up and the section at which said stimulable phosphor sheets are loaded into said cassettes.

2. A noise erasing apparatus for stimulable phosphor sheets as defined in claim 1 wherein said irradiation means has a power within the range of from 3,000 to 100,000 1×·sec.

3. A noise erasing apparatus for stimulable phosphor sheets as defined in claim 1 wherein said irradiation means has a power within the range of from 15,000 to 30,000 1×·sec.

4. A noise erasing apparatus for stimulable phosphor sheets as defined in claim 1 wherein said noise erasing apparatus further comprises a carrying means for moving said stimulable phosphor sheets past said irradiation means.

5. A noise erasing apparatus for stimulable phosphor sheets as defined in claim 4 wherein said noise erasing apparatus further comprises a guiding means for guiding said stimulable phosphor sheets from said aperture of the stimulable phosphor sheet reservoir to said carrying means.

6. A noise erasing apparatus for stimulable phosphor sheets as defined in claim 4 or 5 wherein the carrying speed of said carrying means is controlled with respect to the power of said irradiation means.

7. A noise erasing apparatus for stimulable phosphor sheets as defined in claim 1 wherein said noise erasing apparatus further comprises a supporting means for guiding and supporting said stimulable phosphor sheets past said irradiation means.

8. A noise erasing apparatus for stimulable phosphor sheets as defined in claim 7 wherein said supporting means consists of a pair of plates one of which is transparent.

9. A noise erasing apparatus for stimulable phosphor sheets as defined in claim 8 wherein said transparent plate of said pair of plates is positioned on the side nearer to said irradiation means than the other.

10. A noise erasing apparatus for stimulable phosphor sheets as defined in claim 7 wherein said noise erasing apparatus further comprises a stopper means for holding said stimulable phosphor sheets in a predetermined position as supported by said supporting means.

11. A noise erasing apparatus for stimulable phosphor sheets as defined in any of claims 7 to 10 wherein said noise erasing apparatus further comprises a means for moving said irradiation means along said supporting means.

12. A noise erasing apparatus for stimulable phosphor sheets as defined in claim 11 wherein the moving speed of said irradiation means is controlled with respect to the power thereof.

* * * * *